P. MÜLLER.
POTENTIAL REGULATOR.
APPLICATION FILED NOV. 11, 1912.

1,066,747.

Patented July 8, 1913.

Witnesses:
Irving E. Stern.
Helen Orford.

Inventor
Paul Müller,
by Albert G. Davis
His Attorney.

UNITED STATES PATENT OFFICE.

PAUL MÜLLER, OF CHARLOTTENBURG, GERMANY, ASSIGNOR TO GENERAL ELECTRIC COMPANY, A CORPORATION OF NEW YORK.

POTENTIAL-REGULATOR.

1,066,747.  Specification of Letters Patent.  Patented July 8, 1913.

Application filed November 11, 1912. Serial No. 730,731.

*To all whom it may concern:*

Be it known that I, PAUL MÜLLER, a subject of the Emperor of Germany, residing at Charlottenburg, Germany, have invented certain new and useful Improvements in Potential-Regulators, of which the following is a specification.

My invention relates to potential regulators and particularly to regulators of the type having a rotor carrying a short-circuited winding and a stator having two windings located at an angle to each other, the tap of variable potential being located at the junction point of the stator windings.

The objects of my invention are to provide means for uniformly varying the potential of a variable potential tap, to secure as uniform a torque as possible, and to cause both stator windings to divide the working current in all positions of the rotor. To this end I provide a second winding on the rotor at an angle to the short-circuited winding equal to the angle between the two stator windings and impress on this winding a suitable alternating voltage. Preferably the numbers of turns in this additional winding and in each of the two stator windings are equal; in this case the terminals of the additional winding on the rotor may be connected to the terminals of the regulator thus having impressed on it a voltage equal to the voltage impressed on the combined stator windings. There is, however, nothing to prevent the selection of some other number of turns and some other suitable voltage. In consequence of various differences between the two coils, under some circumstances the current distribution may not be exactly uniform; in order to insure this the two windings of a small transformer of a one to one ratio may be connected in series with the stator windings respectively.

Figure 1:
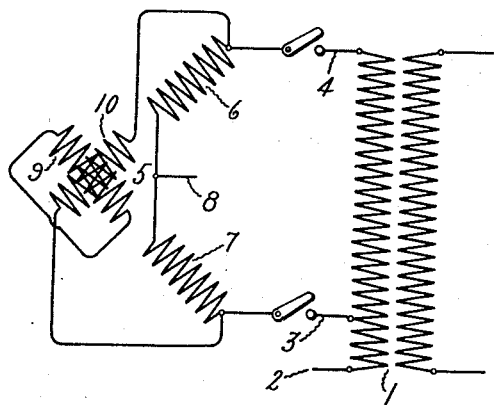
Figure 2:
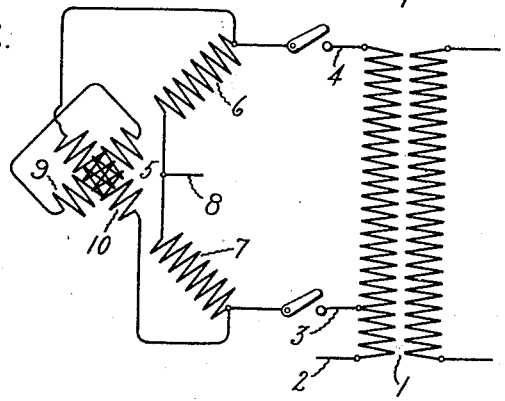
Figure 3:
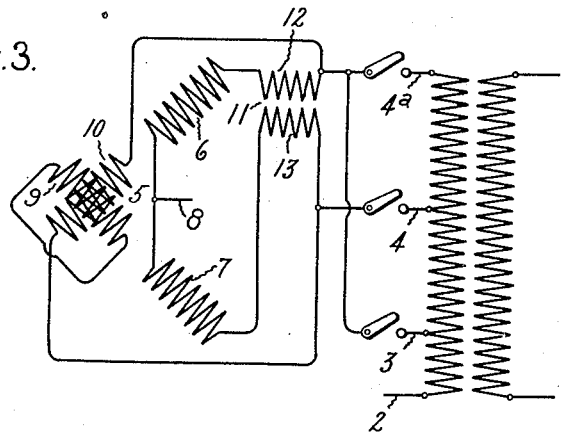

In the accompanying drawing which forms a part of this specification Figures 1 and 2 show diagrammatically my regulator connected between two taps of a stationary transformer, the rotor being in different positions in the two figures; Fig. 3 also shows diagrammatically my regulator in connection with a stationary transformer, the regulator in this case including the small transformer to assure the equal distribution of the working current through the two stator coils.

Referring first to Figs. 1 and 2: 1 is a stationary transformer one winding of which is provided with the three taps 2, 3 and 4. The regulator 5 has two windings 6 and 7 on its stator, displaced from each other by an angle of 90 electrical degrees. Similar ends of the two windings are joined together and at this junction point the tap 8 is connected. The outer ends of the stator windings may be connected to the taps 3 and 4 through the switches shown. On the rotor are placed the two windings 9 and 10. The winding 9 is short-circuited on itself. The winding 10 is connected to the outer terminals of the stator windings and thus has impressed on it the same voltage as is impressed on the two combined stator windings. Such a regulator is adapted to gradually vary the potential of the terminal 8 from that of the terminal 3 to that of the terminal 4 or vice versa, by rotating the rotor through ninety electrical degrees. The rotor may be stopped and held in any intermediate position to obtain a corresponding intermediate potential at the tap 8.

To simplify the explanation of the operation of the regulator I shall assume the potential of the tap 2 to be zero; the potential of the tap 3 is then of some value and that of the tap 4 is of some greater value. Assume the switches closed, the load is of course connected between taps 2 and 8; now in the absence of windings on the rotor, obviously no appreciable current could flow through the stator windings 6 and 7. With the short-circuited rotor winding 9 in the position shown in Fig. 1, however, the stator winding 7 offers but little resistance to the flow of current therethrough while the impedance of the stator winding 6 is still at a maximum, and hence practically the potential of the tap 3 is established at 8. The entire working current flows through the stator winding 7 with such a simple structure in this position of the rotor. The rotor may be rotated through ninety electrical degrees to the position shown in Fig. 2 and during such rotation the potential of the tap 8 gradually rises until finally it reaches the value of that of the tap 4. Now the entire working current flows through the stator winding 6, the current through the winding 7 being inappreciable; only while the rotor is at, and very near, the midpoint of its movement do the two stator windings share the working current with any degree of equality. Now the additional rotor winding 10 tends to maintain this equality between the currents in the two stator coils 6 and 7. Consider the apparatus in the position shown in Fig. 1: There are two paths from tap 3 to tap 8, one through the winding 7 and one through the coils 10 and 6 in series; these two latter coils are in close inductive relation and hence as the ampere turns of the winding 7 are compensated for by the short-circuited coil 9 so are the ampere turns of the winding 6 compensated for by the coil 10. From the tap 4 toward the tap 8 there is no similar compensation and hence the potential of tap 8 is that of tap 3. In the position of Fig. 2, likewise, the short-circuited coil 9 supplies the compensating ampere turns for the winding 6 and the other rotor winding 10 those for the winding 7 resulting in a potential at 8 equal to that at 4. The result of all this is that the stator windings 6 and 7 tend to share the working current equally, the torque of the rotor is substantially the same in all its positions and the potential of the tap 8 is varied uniformly from that of tap 3 to that of tap 4.

When the rotor is in the position shown in Fig. 1 there is no appreciable current through tap 4 and likewise when the rotor is in the position shown in Fig. 2 there is no appreciable current through the tap 3, the other tap in each case carrying the entire working current. These are the limiting positions of the rotor and hence, since the switches may be opened with impunity at these positions, the regulator may be used, by the aid of intermediate taps in the stationary winding, to carry a lead from one tap of a stationary transformer to another where the entire range is considerably greater than that of the regulator. Thus in Fig. 3 the range of the regulator is presumed to be equal to the difference in potential between taps 3 and 4, which is equal to that between 4 and 4ª. Suppose it is desired to raise tap 8 from the potential of tap 3 to that of tap 4ª; assume the switches at 3 and 4 closed and the rotor in such a position that the potential at 8 is equal to that at 3: the rotor is moved until the potential of 8 is that of 4; the switch at 3 may now be opened, there being no current through it, and later the switch at 4ª may be closed; the rotor may then be moved again and the potential of 8 raised to that of 4ª, the result desired.

To make sure that the currents in the two stator windings will be as nearly equal as may be the small transformer 11 may be employed. This transformer is of a one to one ratio. One of its windings 12 is connected immediately in front of the stator winding 6 and the other immediately in front of the stator winding 7.

What I claim as new and desire to secure by Letters Patent of the United States is:

1. A regulator comprising two windings electrically at an angle to each other and, in inductive relation, and rotatable relative thereto, a short-circuited winding and a working winding at the same angle to each other.

2. A regulator comprising two windings of approximately the same number of turns and electrically at an angle to each other and, in inductive relation, and rotatable relative thereto, a short-circuited winding and a working winding at the same angle to each other, the working winding having approximately the same number of turns as each of the first-mentioned windings and being connected to the terminals thereof.

3. A regulator comprising two windings of approximately the same number of turns and electrically at an angle to each other and, in inductive relation, and rotatable relative thereto, a short-circuited winding and a working winding at the same angle to each other, the working winding having approximately the same number of turns as each of the first-mentioned windings.

4. A regulator comprising two windings of approximately the same number of turns and electrically at an angle to each other, a transformer of a one to one ratio having its windings connected respectively in series with said windings, and, in inductive relation, and rotatable relative to said first-mentioned windings, a short-circuited winding and a working winding at the same angle to each other, the working winding having approximately the same number of turns as each of the first-mentioned windings.

In witness whereof, I have hereunto set my hand.

PAUL MÜLLER.

Witnesses:
WOLDEMAR HAUPT,
HENRY HASPER.

---

Copies of this patent may be obtained for five cents each, by addressing the "Commissioner of Patents, Washington, D. C."